US011827008B2

(12) United States Patent
Boyd et al.

(10) Patent No.: US 11,827,008 B2
(45) Date of Patent: Nov. 28, 2023

(54) ORGANICALLY MODIFIED CHALCOGENIDE POLYMERS FOR USE AS OPTICAL ADHESIVE MATERIALS

(71) Applicant: The Government of the United States of America, as represented by the Secretary of the Navy, Arlington, VA (US)

(72) Inventors: Darryl A. Boyd, Alexandria, VA (US); Jason D. Myers, Alexandria, VA (US); Vinh Q. Nguyen, Fairfax, VA (US); Daniel J. Gibson, Cheverly, MD (US); Colin C. Baker, Alexandria, VA (US); Woohong Kim, Lorton, VA (US); Jasbinder S. Sanghera, Ashburn, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 348 days.

(21) Appl. No.: 17/110,687

(22) Filed: Dec. 3, 2020

(65) Prior Publication Data
US 2021/0162709 A1 Jun. 3, 2021

Related U.S. Application Data

(60) Provisional application No. 62/942,858, filed on Dec. 3, 2019.

(51) Int. Cl.
| | |
|---|---|
| *B32B 7/12* | (2006.01) |
| *B32B 7/023* | (2019.01) |
| *B32B 37/12* | (2006.01) |
| *B32B 33/00* | (2006.01) |
| *C09J 163/00* | (2006.01) |
| *C09J 11/04* | (2006.01) |

(52) U.S. Cl.
CPC ............... *B32B 7/12* (2013.01); *B32B 7/023* (2019.01); *B32B 33/00* (2013.01); *B32B 37/1207* (2013.01); *C09J 11/04* (2013.01); *C09J 163/00* (2013.01); *B32B 2305/72* (2013.01); *B32B 2307/412* (2013.01); *B32B 2307/704* (2013.01); *B32B 2318/00* (2013.01); *B32B 2551/00* (2013.01)

(58) Field of Classification Search
CPC ......... C09J 163/00; C09J 11/04; B32B 7/023; B32B 7/12
See application file for complete search history.

(56) References Cited

U.S. PATENT DOCUMENTS

| | | | |
|---|---|---|---|
| 2012/0206796 A1* | 8/2012 | Gibson | G02B 3/0087 65/102 |
| 2017/0145167 A1* | 5/2017 | Baker | C08G 83/001 |

* cited by examiner

*Primary Examiner* — Vishal I Patel
(74) *Attorney, Agent, or Firm* — US Naval Research Laboratory; Rebecca L. Forman

(57) ABSTRACT

A method for bonding infrared transparent materials by placing a polymer comprising at least one chalcogenide element and crosslinking moieties between infrared-transparent optical elements and applying heat, pressure, or both. The crosslinking moieties may be organic, inorganic, or both. Also disclosed is the related bonded assembly comprising infrared transparent optical elements.

9 Claims, 5 Drawing Sheets

ORGANICALLY MODIFIED CHALCOGENIDE POLYMERS FOR USE AS OPTICAL ADHESIVE MATERIALS

PRIORITY CLAIM

The present application is a non-provisional application claiming the benefit of U.S. Provisional Application No. 62/942,858 filed on Dec. 3, 2019, by Darryl A. Boyd et al., entitled "ORGANICALLY MODIFIED CHALCOGENIDE POLYMERS FOR USE AS OPTICAL ADHESIVE MATERIALS," the entire contents of which is incorporated herein by reference.

BACKGROUND OF THE INVENTION

Field of the Invention

The present invention relates generally to infrared compatible optical adhesives, and more specifically to the use of inorganic-organic polymers as optical adhesive materials to optically adhere two optical elements.

Description of the Prior Art

Optical adhesives are necessary in numerous optical applications, including use in electro-optics, lasers, photonics and lens-to-optical mounting. Despite their common uses, optical adhesives tend not to be useful for applications in which infrared transmission is required because their useful optical transmission ceases at ~1.5 µm due to molecular absorption. This deficiency limits their use and thusly creates a critical need for infrared transmissive optical adhesives. The major requirements for useful infrared (IR) transmissive optical adhesives include high refractive indices and strong transmission that extends into the MWIR.

Optical adhesives are widely used in ultraviolet to short wave infrared (SWIR) wavelength optical assemblies to create doublets, ruggedize assemblies, reduce air gaps, and minimize optical assemblies. A technology gap exists for mid wave infrared (MWIR) (3-5 µm), long wave infrared (LWIR) (8-12 µm), and multi-band (3-12 µm) IR imaging sensors.

Norland optical adhesives are established as an industry standard. They have a wide range of adhesives for index matching optics. However, these adhesives strongly absorb light beyond 2 µm (which is typical of organics). Thus, they work only for visible wavelengths and not IR wavelengths.

Some attempts were made to use low melting chalcogenide glass (e.g., $As_2S_3$, $As_2Se_3$, etc.) to bond IR optics (Schott NA). These transmitted in the IR. However, they had poor adhesion leading to mechanical failure of the optic. In addition, they had poor index-matching for many optical materials resulting in low performance.

It is common that two or more optical components are bonded to correct chromatic aberration in lenses. The lenses are typically made of different types of optical materials. There is a need for an adhesive that matches the lenses' refractive index.

BRIEF SUMMARY OF THE INVENTION

This invention disclosure describes the use of inorganic-organic polymers as optical adhesive materials to optically adhere two optical elements. These polymers are comprised of chalcogenide elements such as sulfur and selenium, along with organic and/or inorganic crosslinking moieties that aid in determining material physical and optical properties. These optical adhesive materials are ideally suitable for optical applications in SWIR, MWIR and LWIR regions, but are also useful in other optical transmission regions. The properties of this optical adhesive material can be controlled by exploiting both the inorganic and organic components.

The modified chalcogenide polymers of the present invention fill a technology void for IR optical adhesives. Bonded optics allow for more rugged and compact optical assemblies for imaging sensors. These polymers have been shown to successfully bond to several common IR lens materials including, but not limited to, chalcogenides, oxides, and fluorides.

The present invention provides several advantages. It creates a material with infrared transmission capability that extends beyond the transmission capability of common optical adhesives. It creates a material and method to adhere that material to common optical materials. It utilizes the material for use as an optical adhesive that functions from the visible into the LWIR.

These and other features and advantages of the invention, as well as the invention itself, will become better understood by reference to the following detailed description, appended claims, and accompanying drawings.

BRIEF DESCRIPTION OF THE DRAWINGS

FIGS. 2A-2D show various sets of infrared transmitting optical materials with IR optical adhesive in between. FIG. 2A shows spinel. FIG. 2B shows zinc sulfide. FIG. 2C shows calcium fluoride. FIG. 2D shows zinc selenide. The organically modified chalcogenide polymer (optical adhesive) thickness is ~1.5 mm for FIGS. 2A-2D.

DETAILED DESCRIPTION OF THE INVENTION

The present invention employs the use of chalcogenide-based, inorganic-organic polymers as adhesives between multiple optical materials. The polymer comprises at least one chalcogenide element and organic, inorganic, or both crosslinking moieties. These polymers possess high refractive indices (n>1.7), and optical transmission (>30%) at visible, near infrared (NIR) (380-700 nm), SWIR (1-3 µm), MWIR (3-5 µm), and LWIR (8-12 µm) wavelengths. The high refractive index of these materials makes them well-matched to common inorganic optical materials used in the MWIR and LWIR, such as ZnS (n~2.2), reducing optical loss throughout the bonded elements without the need to apply antireflection coatings. Furthermore, the properties of the chalcogenide polymer can be tailored by adjusting the composition of the polymer (e.g. crosslinker/chalcogenide ratio, chalcogen element) to create either improved bonding or an improved optical match to the bonded optical element. The refractive index is tunable to match the substrate.

Chalcogenide-based polymers are used with pressure, heat, solvent, or any combination thereof to bond optical elements together. Typically, pressure and heat are applied to two opposing optical elements with a layer of polymer in between the optical elements. This produces IR transparent optics bonded with an IR transparent polymer.

Figure 1A:
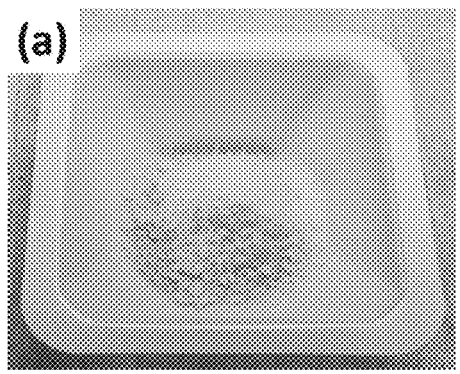
FIG. 1A shows an image of purified polycrystalline sulfur.
Figure 1B:
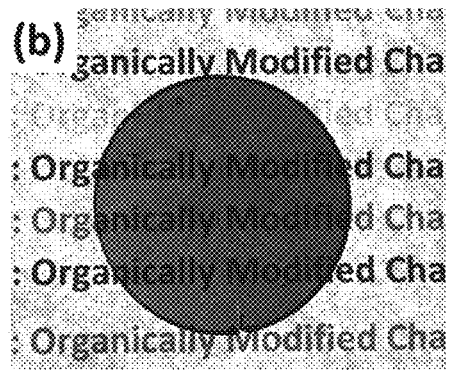
FIG. 1B shows an image of a freestanding organically modified chalcogenide polymer (diameter 5 cm; thickness 1.5 mm).

According to one embodiment of the invention as shown in FIG. 1A, polycrystalline sulfur powder is purified, resulting in sulfur with 99.999% purity. The solid polycrystalline sulfur is heated to ~135° C., melting the sulfur. Polymers containing sulfur are synthesized by adding 1,3-diisopropenyl benzene (DIB) comonomer to the molten sulfur at elevated temperature (>100° C.), and stirred for a short period of time (<10 min) in a Teflon container. The container is then placed in a preheated furnace, and the product cured at high temperature (>150° C.). Finally, the container is removed from the furnace to allow the polymer to cool and be extracted in freestanding form (See FIG. 1B).

Figure 2A:
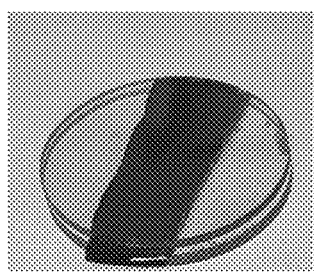
Figure 2B:
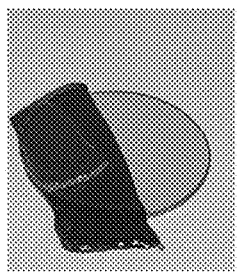
Figure 2C:
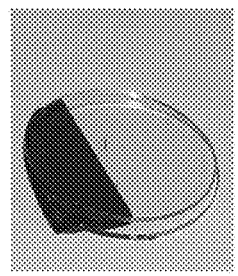
Figure 2D:
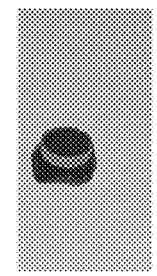

Following polymer formation, the chalcogenide polymers can be adhered to optical devices by placing the polymer onto the optical device and heating the device and/or the polymer for 1 hour. The bonding temperature may be within the range of 20-150° C.; in this embodiment, 100° C. was used. FIGS. 2A-2D show various sets of infrared transmitting optical materials with IR optical adhesive in between. FIG. 2A shows spinel. FIG. 2B shows zinc sulfide. FIG. 2C shows calcium fluoride. FIG. 2D shows zinc selenide. The organically modified chalcogenide polymer thickness was ~1.5 mm for FIGS. 2A-2D. In some embodiments, pressure may be applied to the optical devices to promote adhesion between the two surfaces by applying weight on top of the optical device stack or by other means. A preferential range of applied weight is 0-100 g per $cm^2$ of bonded optical area, with many embodiments requiring 10 $g/cm^2$ or less. In another embodiment, the optical surfaces may be pre-treated with an adhesion layer, such as a thiol-terminated self-assembled monolayer, to promote bonding between the optical surface and the chalcogenide polymer. Alternatively, the chalcogenide polymer may be directly applied to the optical elements before curing, directly from the molten form. Further, the previously-cured chalcogenide polymer may be solubilized or softened by addition of a solvent (such as trichlorobenzene) to promote adhesion and uniform bonding; excess solvent can be driven off either via natural evaporation or heating.

Curing times may range from 10 minutes up to 24 hours. The cure times are dictated by the temperature and chalcogenide polymer properties, including glass transition temperature, chalcogenide composition and comonomer type and concentration. In many embodiments, curing times are on the order of one hour or less.

Although not limited to these thicknesses, the chalcogenide-polymer optical adhesive was successfully demonstrated in experiments as thin as 10 µm and as thick as 2 mm. A preferred embodiment is a single layer of adhesive 5-15 µm thick between two lens elements.

Figure 3A:
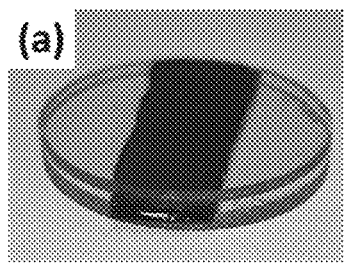
FIGS. 3A and 3B show different angles of a chalcogenide optical adhesive between two layers of spinel.
Figure 3B:
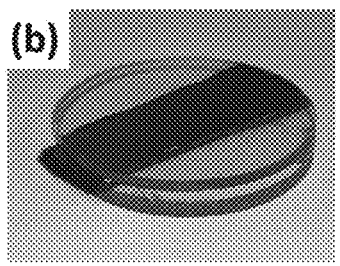
Figure 3C:
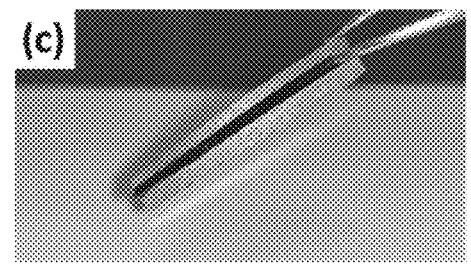
FIG. 3C shows the same sample suspended in air by holding the top spinel layer with forceps. The organically modified chalcogenide polymer (optical adhesive) thickness is 1.56 mm.
Figure 4A:
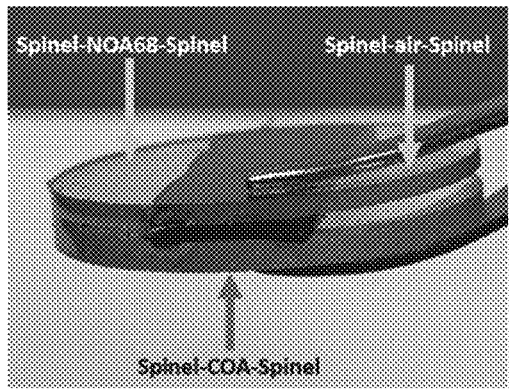
FIG. 4A shows a Norland Optical Adhesive 68 (NOA68), organically modified chalcogenide-polymer optical adhesive (COA), and air sandwiched between two disks of Spinel.
Figure 4B:
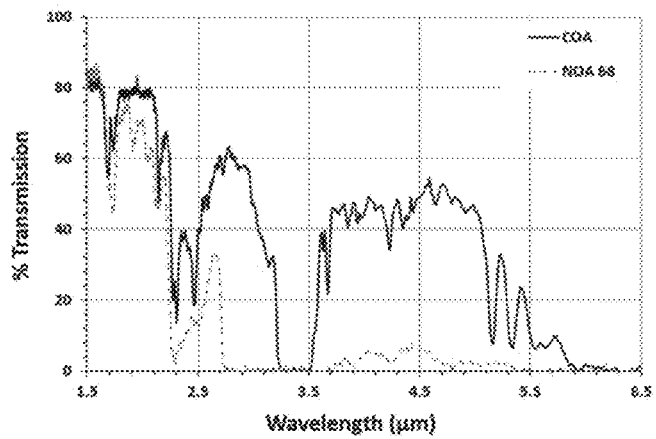
FIG. 4B shows Fourier-transform infrared spectroscopy (FTIR) transmission data: the dashed line shows the region with Spinel-NOA68-Spinel, and the solid line shows the region with Spinel-COA-Spinel.
Figure 4C:
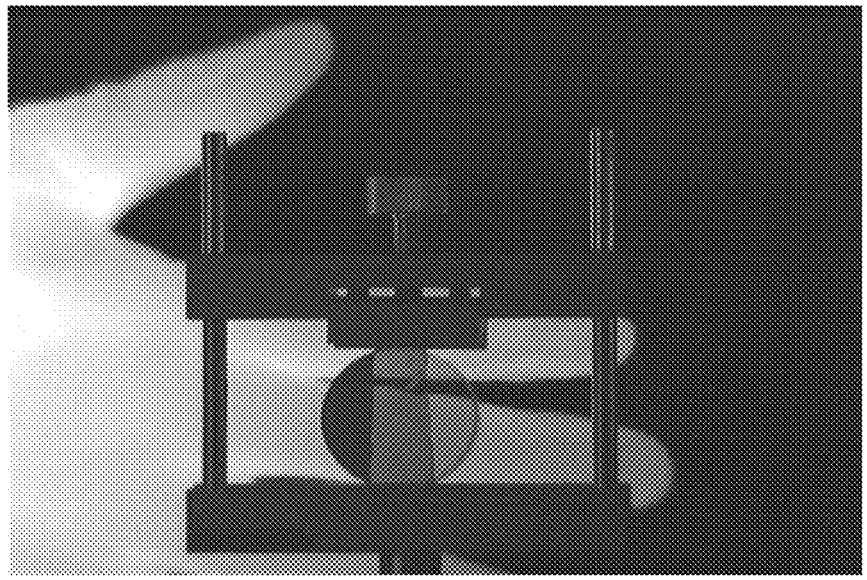
FIG. 4C shows a commercial MWIR (3-5 µm) camera view of the inventor's hand through spinel/adhesive/spinel demonstrating the transmission through the COA (center region) in comparison to NOA68 (left region) and air (right region).

The resulting chalcogenide-polymer optical adhesive (COA) can bind various optical materials. FIGS. 3A-3C show different angles of a chalcogenide optical adhesive between two layers of spinel. When sandwiched between spinel, the optical transmission in the infrared (IR) region is much greater than that of common industrial optical adhesives such as Norland Optical Adhesive 68 (NOA68) (see FIGS. 4A and 4B and 4C). FIG. 4A shows 2 spinel flats (1.5 mm each) with NOA68 (1.5 mm thick) between the spinel flats in one region, COA (1.5 mm thick) between the spinel flats in another region, and air between the spinel flats in yet another region. FIG. 4B shows Fourier-transform infrared spectroscopy (FTIR) transmission data: the dashed line shows the region with Spinel-NOA68-Spinel, and the solid line shows the region with Spinel-COA-Spinel. FTIR data was taken under $N_2$ purge, with background correction to remove atmospheric $CO_2$ peaks ~4.2-4.5 µm. The spectral range was limited by spinel optics which cut off around 5.5 µm. The theoretical transmission using COA without AR coatings should be >86%, which is better than spaced spinel optics separated by air (75.7%) and spinel optics separated by NOA68 (<10%). The measured transmission was limited by non-optimized coverage, excess adhesive thickness, and dust/internal scattering. Transmission in the 3.5-5.5 µm region was sufficient for imaging applications. For optimized use, the adhesive would be thinner (5-15 µm) and more uniform. FIG. 4C shows a commercial MWIR (3-5 µm) camera view of the inventor's hand through spinel/adhesive/spinel demonstrating the transmission through the COA (center region) in comparison to NOA68 (left region) and air (right region).

Figure 5:
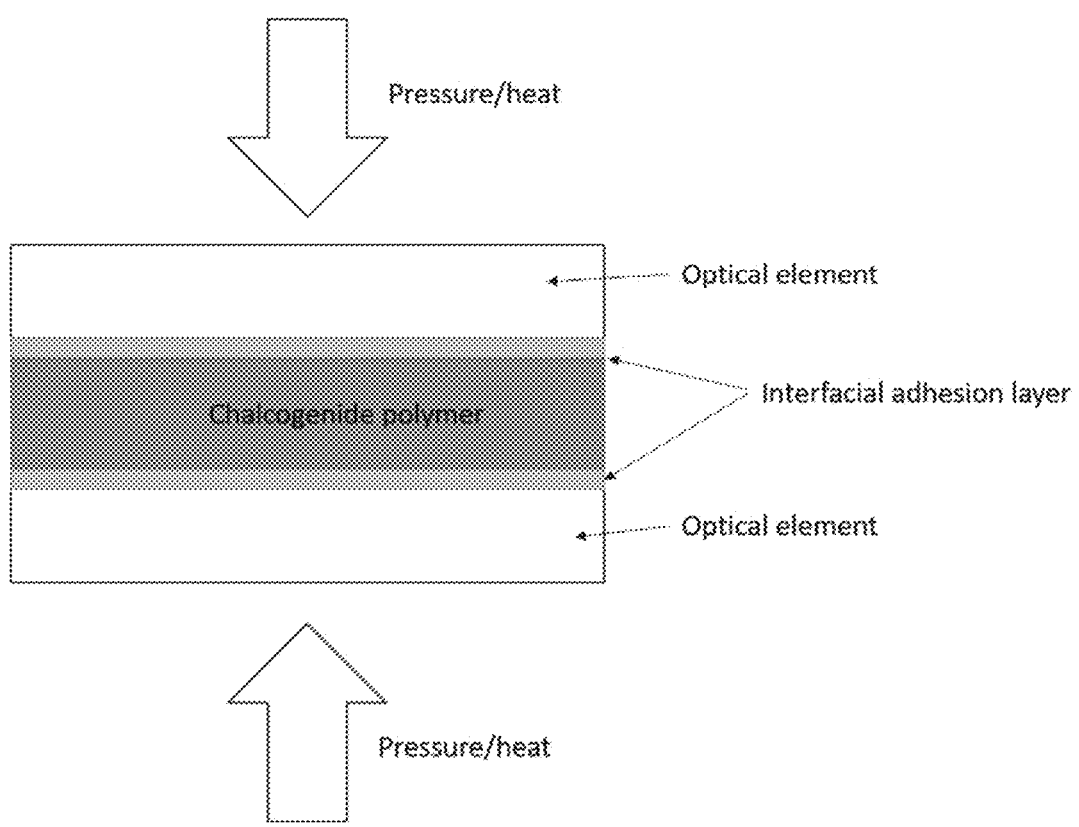
FIG. 5 is a diagram outlining the location of the COA between optical elements.
Figure 6:
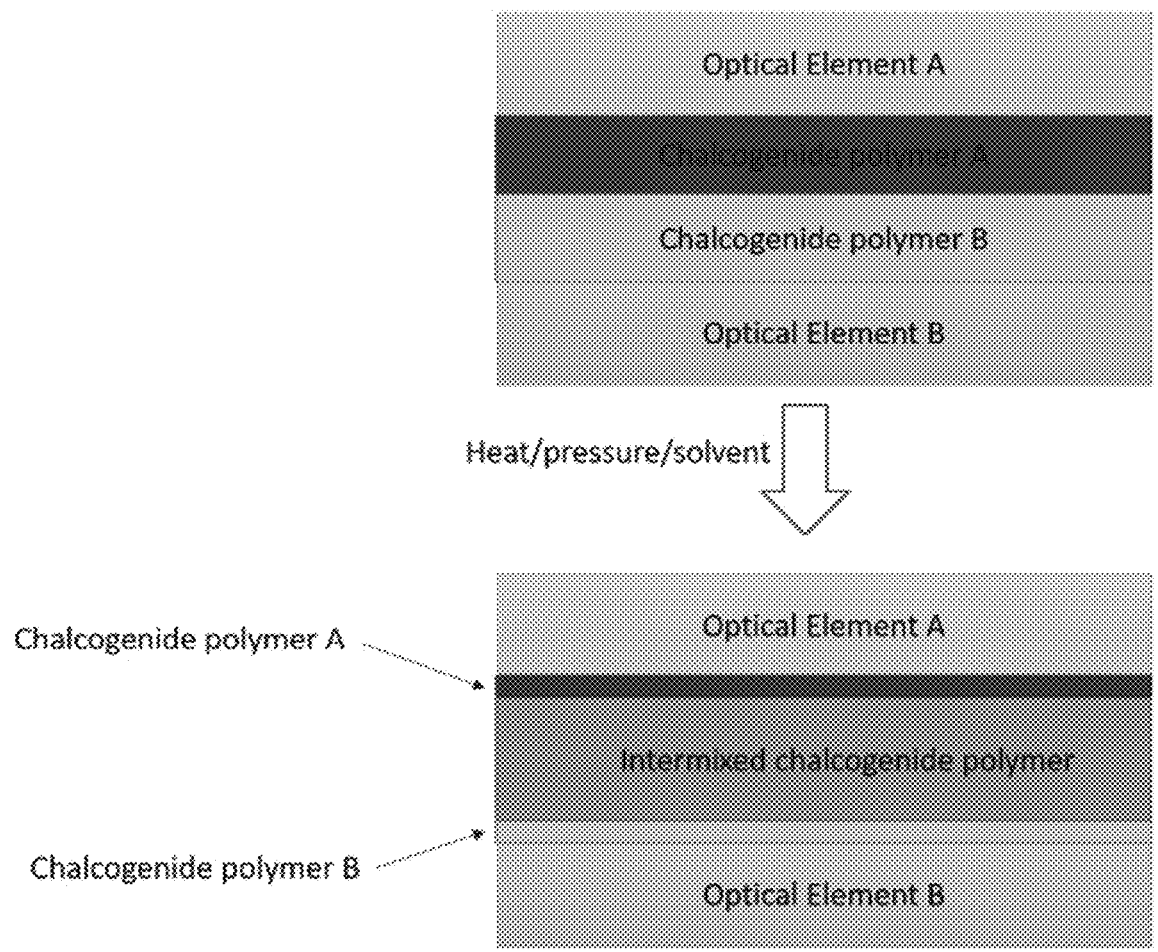
FIG. 6 is a diagram showing the use of multiple COA layers between different optical elements.

FIGS. 5 and 6 detail potential modes of implementation for COAs. FIG. 5 is a diagram outlining the location of the chalcogenide polymer (optical adhesive) between optical elements. FIG. 6 is a diagram showing the use of multiple COA layers between different optical elements.

As shown in FIG. 5, pressure and heat are applied to opposing sides of two optical elements. There is a chalcogenide polymer between the two optical elements with an interfacial adhesion layer between the chalcogenide polymer and each optical element.

As shown in FIG. 6, multiple chalcogenide polymer may be between two optical elements. The application of heat, pressure, solvent, or any combination thereof, results in optical element A bonded to chalcogenide polymer A and optical element B bonded to chalcogenide polymer B with an intermixed chalcogenide polymer between chalcogenide polymer A and chalcogenide polymer B.

Figure 7:
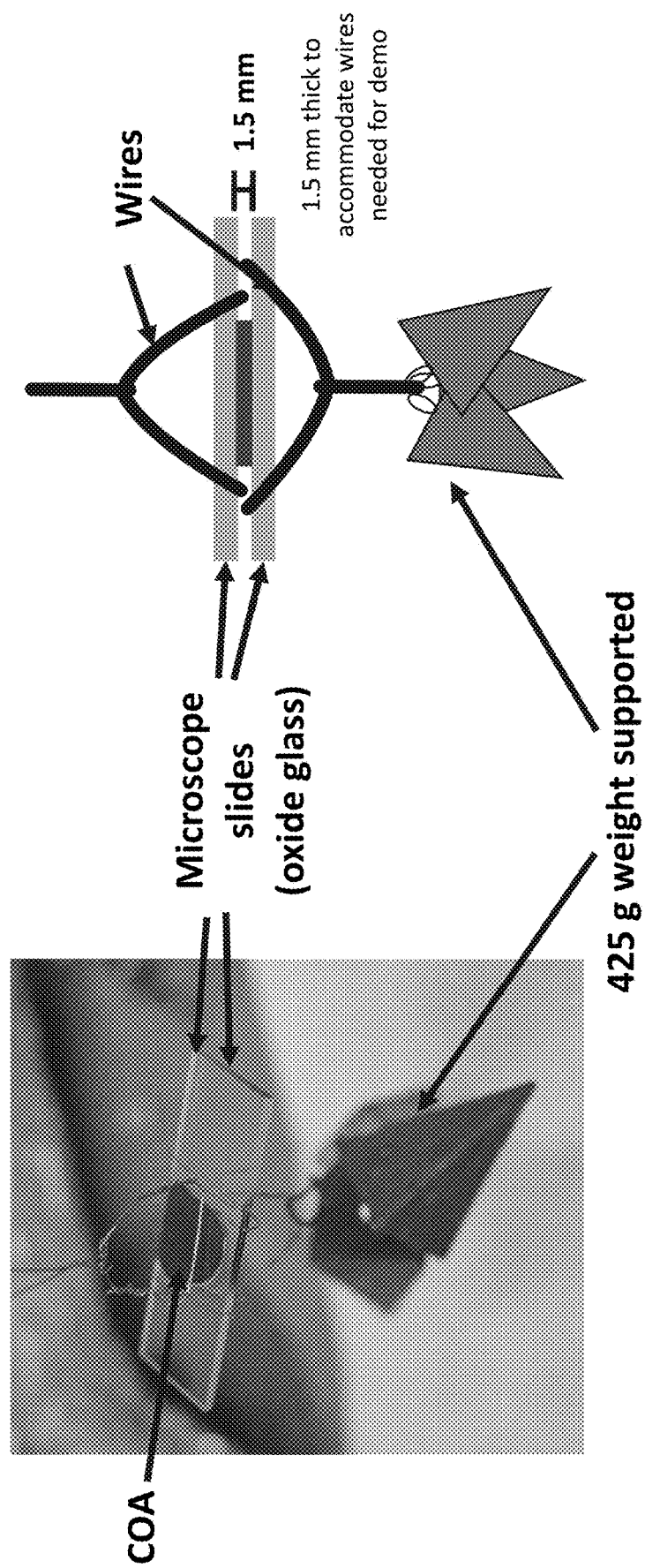
FIG. 7 shows a demonstration (left) and diagram (right) of 1.5 mm thick COA adhering two microscope slides together while supporting 425 g of weight.

FIG. 7 shows a demonstration (left) and diagram (right) of 1.5 mm thick COA adhering two microscope slides together while supporting 425 g of weight.

Throughout this specification, "comonomer" and "crosslinker/crosslinking" terms are used interchangeably. These terms all refer to the non-chalcogen portion of the adhesive material.

Many alternatives to the above described embodiment may be used, including, but not limited to, the following:
Selenium and/or tellurium may also be used in any percentage combination, with or without sulfur.
Other non-chalcogen elements, such as germanium or tin, may also be used in any percentage combination with chalcogen elements.

Comonomer other than DIB may also be used in the fabrication process as comonomers.

Mixtures of comonomers may also be used in the fabrication process.

The reaction temperature may vary.

The reaction time length may vary.

The product cure time may vary.

Non-thermal methods of curing may be employed to cure the adhesive (e.g. UV irradiation, laser energy, or their combination).

The ratio of chalcogen to comonomer may vary.

Adhering temperature may vary.

Adhering time length may vary.

Chalcogenide may be adhered to optical devices by applying pressure.

Chalcogenide may be adhered to optical devices by a combination of increased temperature and applying pressure.

When bonding dissimilar optical elements, two different optical adhesives may be used at the surface of each element to optimize bonding to each element; the two optical adhesives may then be bonded to each other by a combination of temperature, pressure, and/or solvent addition. This method may advantageously create an interdiffused region of gradient optical properties between the two optical surfaces, reducing total optical loss.

Any combination of the above.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method for bonding infrared-transparent materials, comprising:
    placing a polymer comprising at least one chalcogenide element and crosslinking moieties between at least two infrared-transparent optical elements; and
    applying heat, pressure, or both to the at least two infrared-transparent optical elements resulting in a bonded optical assembly.

2. The method of claim 1, wherein the crosslinking moieties are organic.

3. The method of claim 1, wherein the crosslinking moieties are inorganic.

4. The method of claim 1, wherein the crosslinking moieties are organic and inorganic.

5. The method of claim 1, wherein the polymer has a thickness between 10 µm and 2 mm.

6. The method of claim 1, wherein the polymer has a thickness between 5 and 15 µm.

7. The method of claim 1, wherein the at least two infrared-transparent optical elements are pre-treated with an adhesion layer.

8. The method of claim 1, wherein a solvent is added to the polymer to promote adhesion.

9. The method of claim 1, wherein there are more than one polymers comprising at least one chalcogenide element and crosslinking moieties between at least two infrared-transparent optical elements.

* * * * *